(12) United States Patent
Tapuska et al.

(10) Patent No.: US 8,307,051 B2
(45) Date of Patent: *Nov. 6, 2012

(54) MESSAGE SEND QUEUE REORDERING BASED ON PRIORITY

(75) Inventors: David Tapuska, Waterloo (CA); Michael Knowles, Waterloo (CA)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/272,308

(22) Filed: Oct. 13, 2011

(65) Prior Publication Data

US 2012/0036230 A1 Feb. 9, 2012

Related U.S. Application Data

(63) Continuation of application No. 12/686,001, filed on Jan. 12, 2010, now Pat. No. 8,065,396.

(51) Int. Cl.
G06F 15/16 (2006.01)
G06F 15/173 (2006.01)

(52) U.S. Cl. .................. 709/219; 709/232; 709/240

(58) Field of Classification Search .................. 709/207, 709/219, 232, 240; 370/229, 230, 235; 718/103
See application file for complete search history.

(56) References Cited

U.S. PATENT DOCUMENTS

| | | | |
|---|---|---|---|
| 5,623,603 A | 4/1997 | Jiang et al. | |
| 5,778,372 A | 7/1998 | Cordell et al. | |
| 5,826,031 A | 10/1998 | Nielsen | |
| 5,987,466 A | 11/1999 | Greer et al. | |
| 6,018,515 A | 1/2000 | Sorber | |
| 6,154,769 A | 11/2000 | Cherkasova et al. | |
| 6,374,300 B2 | 4/2002 | Masters | |
| 6,633,564 B1 | 10/2003 | Steer et al. | |
| 6,697,859 B1 | 2/2004 | Takahashi | |
| 6,742,016 B1 | 5/2004 | Bhoj et al. | |
| 6,938,097 B1 | 8/2005 | Vincent et al. | |
| 6,940,813 B2 | 9/2005 | Ruutu | |
| 6,965,604 B1 | 11/2005 | Sato et al. | |
| 6,968,379 B2 | 11/2005 | Nielsen | |
| 6,996,393 B2 | 2/2006 | Pyhalammi et al. | |
| 7,090,749 B2 | 8/2006 | Flores et al. | |
| 7,136,392 B2 | 11/2006 | Wentink | |
| 7,355,608 B1 | 4/2008 | Beach | |

(Continued)

FOREIGN PATENT DOCUMENTS

GB 2360675 A 9/2001

(Continued)

OTHER PUBLICATIONS

Liljeberg, M. et al. "Optimizing World-Wide Web for Weakly Connected Mobile Workstations: An Indirect Approach", Services in Distributed and Networked Environments, 1995. Los Alamitos, CA, USA, IEEE Comput. Soc, Jun. 5, 1995. pp. 132-139.

(Continued)

Primary Examiner — Aaron Strange
(74) Attorney, Agent, or Firm — Norton Rose Canada LLP (57) ABSTRACT

A method and system for communicating serialized data provides a mechanism for ordering the data in response to a priority. In an embodiment, a server sending the data uses the priority to order the data in a message send queue for sending the data to a requesting device. The server may comprise a gateway and the second device a wireless device communicating with the gateway. The wireless device may send a priority indication in association with a request for the data to facilitate the ordering.

23 Claims, 4 Drawing Sheets

U.S. PATENT DOCUMENTS

| | | |
|---|---|---|
| 2002/0095596 A1 | 7/2002 | Williams |
| 2003/0188013 A1 | 10/2003 | Nishikado et al. |
| 2004/0006602 A1 | 1/2004 | Bess et al. |
| 2004/0151114 A1 | 8/2004 | Ruutu |
| 2005/0149622 A1 | 7/2005 | Kirkland et al. |
| 2005/0240940 A1 | 10/2005 | Quinet et al. |

FOREIGN PATENT DOCUMENTS

| | | |
|---|---|---|
| WO | 03088924 A1 | 10/2003 |

OTHER PUBLICATIONS

Tsuji, J. et al. "Proposal for Transfer Error Recovering on Broadcasting Network". Parallel Processing, 1999. Los Alamitos, CA, USA, IEEE, Sep. 21, 1999. pp. 126-130.

Handley, M. et al. "RFC 2543: Session 9, 14 Initiation Protocol" [Online] Mar. 1999. Retrieved from the Internet: URL: http://www.ietf.org/rfc/rfc243.txt?number=2443>[retrieved on Aug. 12, 2004]. p. 34, item 6.1. p. 43, item 6.25.

MESSAGE SEND QUEUE REORDERING BASED ON PRIORITY

FIELD OF THE INVENTION

The present invention relates to a method and system for reordering a message send queue based on a priority of the message to be sent.

BACKGROUND OF THE INVENTION

Mobile devices such as wireless communication devices providing voice communications, data communications or both in a wireless communication network are increasingly prevalent in modern society. Such devices may also provide additional personal digital assistant (PDA) functions such as a calendar, alarm, contact lists, calculators, etc. One common feature of such devices is a World Wide Web browser facility whereby a user may navigate web pages such as those made available through an intranet or the public Internet.

During a browsing experience, a web browser acquires web page data to render the web page on a display of the device. The web browser formulates requests for data using a protocol such as the Hyper Text Transfer Protocol (HTTP) for requesting data from a web page server. In a wireless device, the requests and responses are typically communicated between the wireless device and the web page server through an intermediate server providing gateway services, bridging communications between the wireless network and the network of the web page server.

The gateway receives the requests from the wireless device and forwards them to the web server for service. Responses from the web server are received by the gateway and queued for communication to the wireless device.

To obtain the data for a single web page, a browser is often required to formulate more than one request. Occasionally, a response for a second request is required to be received and processed before the response for an earlier request is fully processed by the wireless device. When such a secondary HTTP request is made to the server while the communication of a response to an earlier request may be pending or in progress, the gateway sends any data that it has in its send queue until the entire response of the first request is completed. As a result, the web browser is delayed in receiving the response to the secondary request until it receives the entire response to the earlier request.

By way of an example, a browser of the wireless device may encounter a JavaScript™ source or cascading style sheet (css) reference in a response while loading a web page. Such references require immediate action. The browser is required to fetch the data for the reference, via a second request. It is also required to pause any further rendering of the page for any response data it may have until the new reference is completed. However, the send queue of the gateway may contain the remainder of the response to the first request while it receives the response to the second request. Send queues operate in accordance with first in first out (FIFO) rules. As such, the gateway puts the response to the second request at the end of its queue for sending after it completes the sending of the first response. Though such a manner of FIFO operation in a queue serializing response data is often desirable, it is apparent there are situations were a different ordering of communications may be required. When a secondary response requiring immediate action itself comprises a reference requiring immediate action, the delay experienced may be further compounded. As a result, a satisfying user experience may be affected. Web page loading times appear to lengthen when incomplete screens are displayed while waiting for additional data.

A solution to one or more of these shortcomings is therefore desired.

SUMMARY OF THE INVENTION

Therefore, there is a need for a method and system whereby a first device (e.g. a wireless handheld device or mobile station) may send a request to a second device (e.g. a wireless gateway server or other server) for response data having a higher priority than response data for an earlier request which is still transferring to the first device from the second device. Further there is a need for a second device (e.g. the server) to process the prioritized requests accordingly, inserting the higher priority response data into a content stream that the second device is transmitting to the first device, pre-empting any earlier lower priority response data that may already be enqueued.

Preferably, to accommodate a need for multiple levels of priority, a multi-level priority mechanism is desired whereby higher-priority responses pre-empt any lower-priority responses in a response queue.

In accordance with an embodiment of the invention, an HTTP header for a send request is adapted to include a priority indication of the request's relative priority (e.g.: x-rim-priority-request "priority number"). The priority indication instructs a gateway to order the response data for the request so that the response data for the request arrives at the requesting device ahead of lower priority response data that may be in the gateway's send queue.

These and other aspects including one or more method aspects and computer program product aspects will be apparent to those of ordinary skill in the art.

BRIEF DESCRIPTION OF THE DRAWINGS

In order that the invention may be readily understood, embodiments of the invention are illustrated by way of examples in the accompanying drawings, in which.

DETAILED DESCRIPTION

Figure 1:
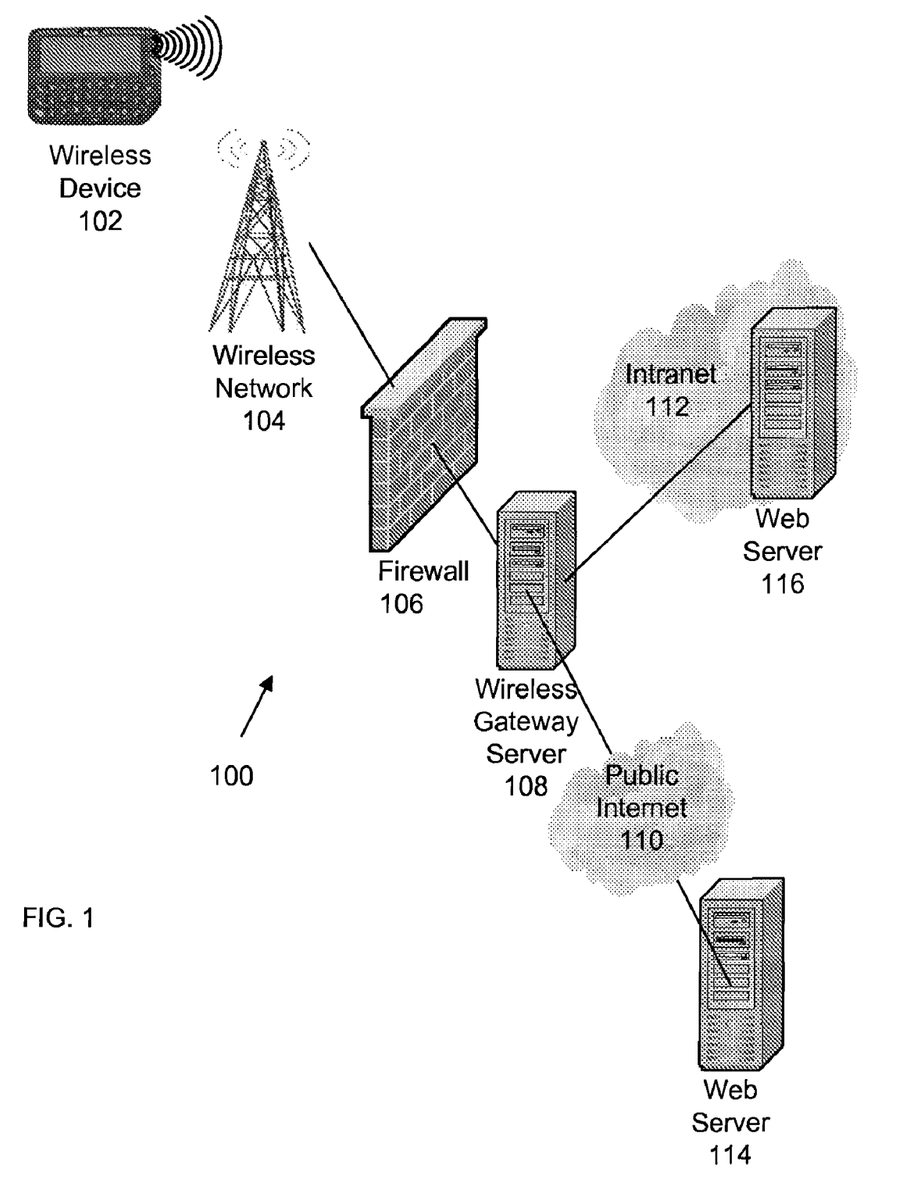
FIG. 1 is a schematic diagram of a system architecture in accordance with an embodiment of the invention.

FIG. 1 is a schematic illustration of an architecture for a system 100 in accordance with an embodiment of the invention. System 100 comprises a wireless communication device 102 coupled for communicating wirelessly with a wireless network 104 symbolized by a base station. Wireless network 104 may conform to any of the wireless network technologies and protocols capable of supporting data communications including cellular, wide-area network, GSM, GPRS, CDMA, iDEN™, Mobitex™, etc.

Wireless communication device 102 is adapted for web browsing and is capable of sending HTTP requests for web page data and receiving responses thereto comprising response data through wireless network 104 in accordance with one or more protocols implemented by the network 104. Wireless network 104 is further coupled for communication to a wireless gateway server 108 providing data communications services to the wireless device 102. In the present embodiment, wireless gateway server 108 is configured behind a firewall 106 well-known to those skilled in the art. Though not shown, intermediate wireless gateway server 108 and wireless network 104 may be a public relay and a public network such as the Internet. Wireless gateway server 108 may include but is not limited to a BlackBerry™ Enterprise Server or a wireless access protocol (WAP) gateway.

Through wireless gateway server 108, wireless device 102 may be coupled for communication over a network such as the public Internet 110 or an intranet 112 to a content server such as web servers 114 and 116.

In the illustrated embodiment of this invention, the wireless device 102 sends an HTTP request (i.e. a GET) for service by web server 114 or 116 through the firewall 106, to wireless gateway server 108. The wireless transport gateway is configured to provide access (i.e. HTTP connectivity), which is preferably secure, to intranet 116 and the public Internet 114. The wireless gateway server 108 performs the necessary address and protocol translation to route data between the wireless and IP networks. Optionally and preferably for handheld wireless devices such as device 102, the wireless gateway may convert and process data that passes between a content server, such as web server 114, 116, and an application resident on wireless device 102. Gateways may perform custom filtering and other data functions to deliver content to handhelds in an efficient and appropriate format.

Wireless gateway server 108 routes communications from the wireless device 102 (e.g. a GET) to the appropriate web server on the appropriate network. Once a response including response data (e.g. a portion of a web page such as part of an Hyper Text Markup Language (HTML) file) is returned to the gateway 108, the gateway prepares the response data for the appropriate wireless protocol of wireless network 104. The gateway 108 puts the response data, typically in a packet form according to a protocol of the wireless network, in a send queue for communicating to the wireless device 102 via the firewall and network 104.

In accordance with the present embodiment, the wireless device 102 is adapted to include in an HTTP request a priority indication for instructing a priority handling by the gateway, at least for some requests. As well, the gateway is adapted to prioritize the return of response data in accordance with the priorities of the requests the gateway receives.

Figure 2:
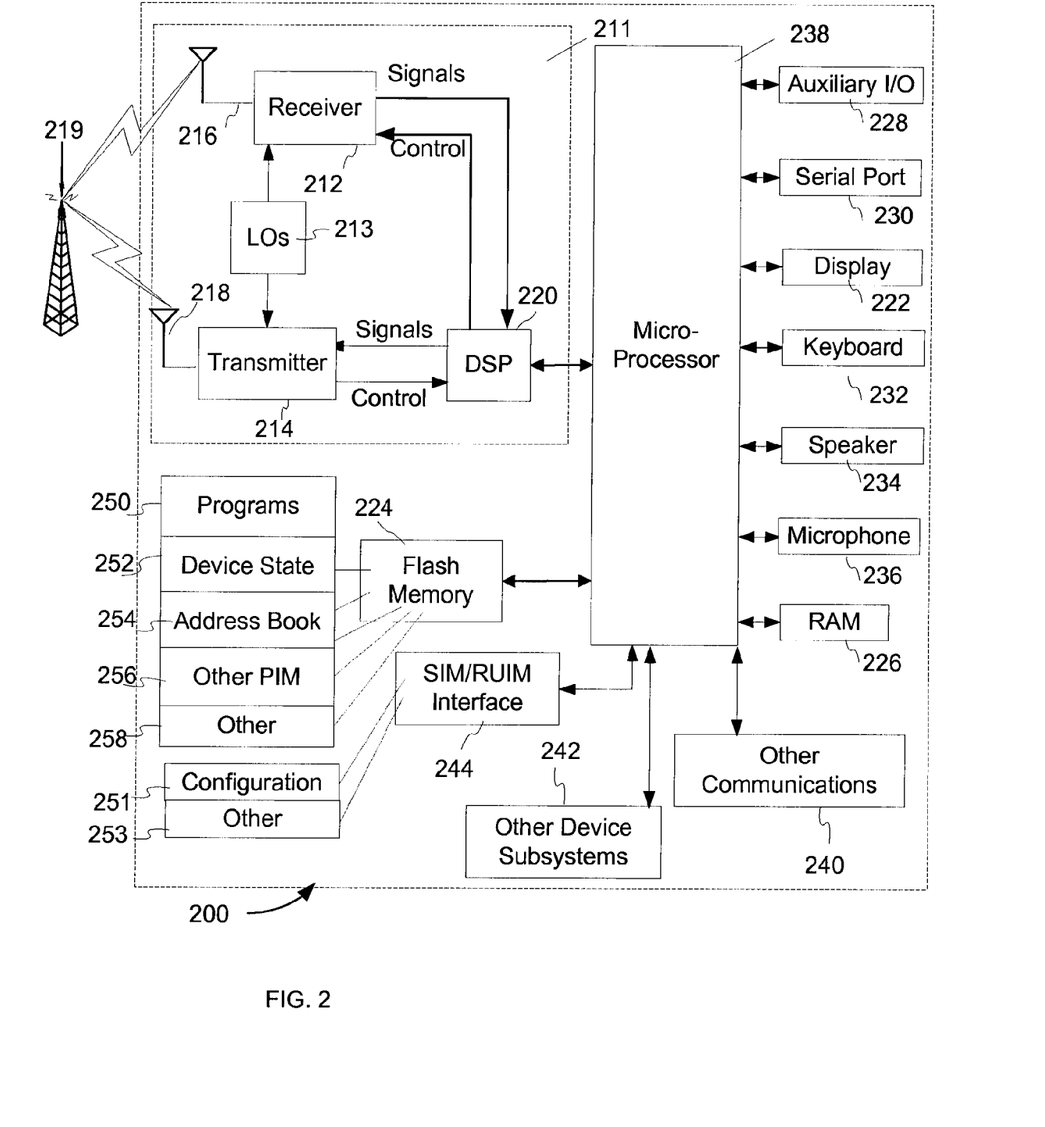
FIG. 2 is a detailed diagram of a preferred wireless communication device of FIG. 1 in accordance with an embodiment of the invention.

FIG. 2 is a block diagram illustrating an embodiment of wireless communication device 104 comprising a mobile electronic device 200 including preferred embodiments of the apparatus and method of the current application. Mobile electronic device 200 is preferably a two-way wireless electronic communication device having at least voice and data communication capabilities. Mobile electronic device 200 preferably has the capability to communicate with other computer systems on the Internet. Depending on the specific functionality provided, the wireless device may be referred to as a data messaging device, a two-way pager, a wireless e-mail device, a cellular telephone with data messaging capabilities, a wireless Internet appliance, or a data communication device, as examples.

Where mobile electronic device 200 is enabled for two-way communication, it incorporates a communication antenna subsystem 211, including both a receiver 212 and a transmitter 214, as well as associated components such as one or more, preferably embedded or internal, antenna elements 216 and 218, local oscillators (LOs) 213, and a processing module such as a digital signal processor (DSP) 220. As will be apparent to those skilled in the field of communications, the particular design of the communication subsystem 211 is dependent upon the protocols of the wireless communications network in which the device 200 is intended to operate.

Mobile electronic device 200 preferably includes a microprocessor 238 that controls the overall operation of the device. Communication functions, including at least data and preferably voice communications, are performed through communication subsystem 211. Microprocessor 238 also interacts with further device subsystems such as the display 222, flash memory 224, random access memory (RAM) 226, auxiliary input/output (I/O) subsystems 228, serial port 230, keyboard 232, speaker 234, microphone 236, a short-range communications subsystem 240 and any other device subsystems generally designated as 242. The microprocessor 238 may also interact with a subscriber identity module/removable user identity module (SIM/RUIM) interface 244. The SIM/RUIM interface 244 may store information about configuration 251 and other data 253.

Flash memory 224 may provide a local store of instructions and data of one or more applications for adapting and configuring the microprocessor to provide various features such as PDA features, a web browser, games, etc. A preferred application that may be loaded onto mobile station 202 may be a personal information manager (PIM) application having the ability to organize and manage data items relating to the user such as, but not limited to, instant messaging (IM), e-mail, calendar events, voice mails, appointments, and task items. Thus flash memory 224 of the present embodiment stores programs 250 (e.g. a web browser, PIM) device state information 252, address book 254, other PIM data 256, and other data and/or instructions 258.

Figures 3A, 3B:
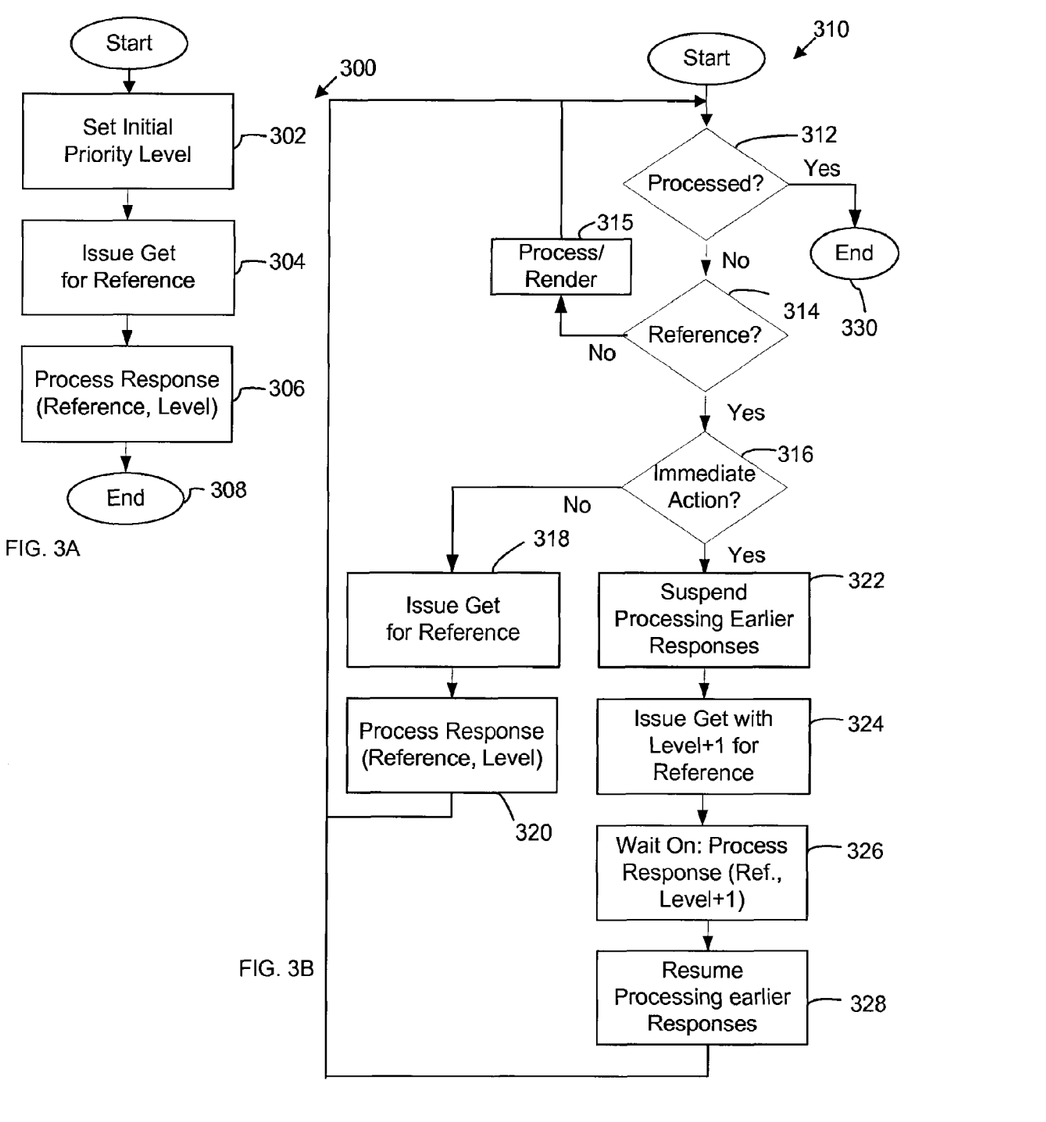
FIGS. 3A and 3B are flowcharts of operations of a mobile device in accordance with an embodiment of the invention illustrating a method for including a priority with a request for data.

FIGS. 3A and 3B illustrate flowcharts of operations of a mobile wireless device (e.g. device 102) in accordance with an embodiment of the invention illustrating a method for including a priority with a request for data. Operations 300 and 310 represent exemplary steps for an embodiment of a browser application for loading web pages. Persons of ordinary skill in the art will appreciate that other applications requesting data may be adapted in a similar manner.

Operations 300 are initiated on the start of a loading of a page. At step 302 an initial priority level is set. The level may be sent with a request for data, for example as part of an HTTP header, as would be understood to a person of ordinary skill in the art. In accordance with the present embodiment of the invention, the priority level is included in requests the responses for which require priority treatment by the gateway but is otherwise omitted from other requests. When a priority level is omitted, the respective responses are given a normal treatment by the gateway (i.e. a respective low priority treatment) and placed at a tail end rather than a head end of the FIFO send queue.

At step 304, a first request for web page data is issued to the gateway to request a response and thereafter at step 306 a process for handling the response to the request is started together with the current priority level. Operations 300 may then end 308.

Operations 310 represent a method for handling a response to a request which may be implemented in accordance with various well-known techniques such as objected-oriented programming and re-entrant coding techniques for programming a processor for handling the response data. At step 312, processing begins to act upon the response data, for example, to render the response on a display of the device. Persons of ordinary skill will appreciate that the response data is typically received as a stream of data in one or more packets and the response is typically processed serially in portions. Hence, as the stream is received, it is processed and a determination is made (step 312) whether the processing of the complete response is complete. If it is not complete, via No branch to step 314, the response is evaluated for a reference requiring a further request for data from a content source such as a web server. If a reference is not found, the portion of the response may be acted on, for example, to render the portion of data on a display of the device (step 315) before looping to step 312.

In the present embodiment relating to processing HTML, a variety of types of references may be encountered that require or otherwise may benefit from an immediate request for the matter identified by the reference. As previously discussed, css and JavaScript™ are examples of such references. However, those of ordinary skill in the art will appreciate that references defining other embedded media within a page may be included. The embodiment disclosed herein is useful when making a determination as to whether or not to render matter identified by an HTML reference; and when that determination changes the path to be taken for processing the rest of the HTML page. For example if an object tag inside an HTML page is encountered, a determination as to whether the device can render that item is to be made. Before the determination is made, it may be necessary to fetch the data.

Object tags may reference a variety of media such as Shockwave-flash, scalable vector graphics (svg), images, and other forms of media. Now typically rendering agents preallocate display space for the object and render additional portions of the pate, going back to adjust the content that was rendered if the object that is fetched can't be processed. However, a rendering agent could also fetch the object and wait for it and then continue processing once a response is received.

If a reference is found at step 314, a further determination is made whether action on the reference is to be immediately taken (step 316). If action is to be immediate, processing of responses on outstanding requests is suspended (step 322). At step 324 a Get request is sent with the priority level increased by one. A process for handling the response is started and the current level plus one is passed to initiate the process. The current process (i.e. current instance of operations 310) then waits on the processing of the response data for the higher priority reference (step 326). Once that other process response instance (i.e. new instance of operations 310) started by step 326 completes, the current process resumes operations, starting the processing of earlier response (step 328), if any, and looping to step 312 for a further determination whether more response data of the current response requires processing.

If at step 316 it is determined that the further reference in the current response does not require immediate action, via No branch to step 318, a request for data identified by the new reference is sent without a priority level and at 320 a process initiated to handle a response for the new reference. Processing of the current response then continues at step 312.

If at step 312 no further response data requires processing, operations 310 end at step 330.

Consider operations 300 and 310 with reference to the pseudo-code block below for a sample web page defined by MainDocument.htm:

```
MainDocument.htm
-----------------
<html>
This is text
<script language="JavaScript"
src="javascripTest.js"></script>
Text after script
</html>
```

Operations 300 commence for loading page MainDocument.htm. The initial priority level may be set (e.g. 0) and at step 304 a GET issued for MainDocument.htm to a web server hosting the page. At step 306, a process (i.e. operations 310) is initiated for handling a response to the request. The current priority level is provided to initiate the level of priority of these operations.

In response to the packets of data received comprising MainDocument.htm, operations 310 process the data. At step 314, the reference JavaScriptTest.js is determined and at step 316 evaluated as a reference requiring immediate action. Processing of response data is suspended, and a GET for the reference is issued (steps 322-324). The GET includes the initial priority level increased by 1 (e.g. 1) in a header portion of the request. The priority may be identified by a reference such as "x-rim-request-priority". At step 326 the current process waits until another instance of operations 310 complete the processing of a response for the reference JavaScriptTest.js. The initial priority level plus 1 is provided to initiate the other process.

The following workflow exchange represents an exchange between mobile device 102 and gateway 108 for the above web page:
   ---> GET MainDocument.htm
   <--- First packet of MainDocument.htm
   ---> Get JavaScriptTest.js (with x-rim-request-priority=1)
   <--- First packet of JavaScriptTest.js
   <--- Last packet of JavaScriptTest.js
   <--- Last packet of MainDocument.htm Consider operations 300 and 310 with reference to the pseudo-code blocks below for a sample web page defined by MainDocument.htm, Script1.js and Script2.js:

```
Script1.js
-----------------
document.writeln("<script src=\"script2.js\"
language=\"JavaScript\">");
-----------------
Script2.js
-----------------
document.writeln("Output of script2");
-----------------
MainDocument.htm
-----------------
<html>
<script src="script1.js" language="JavaScript"></script>
After scripts
</html>
-----------------
```

Figure 4:
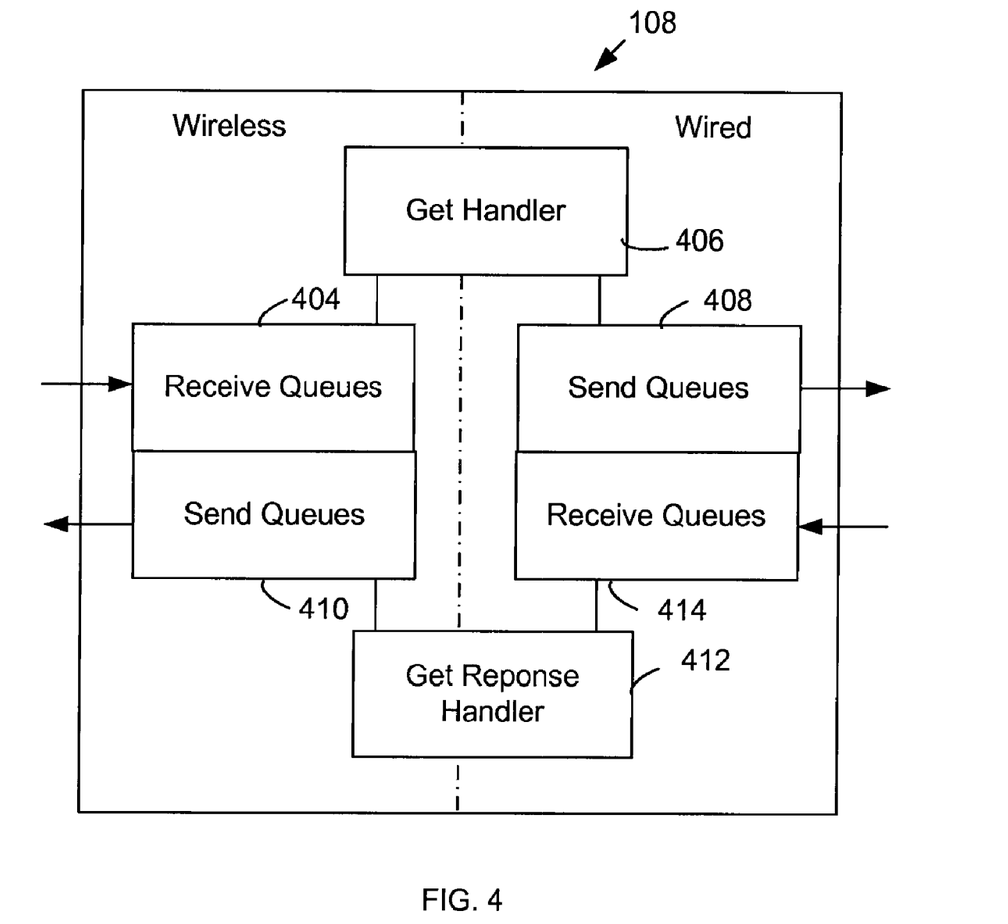
FIG. 4 is an illustration of a wireless gateway server in accordance with an embodiment of the invention.

During rendering of MainDocument.htm, device 102 must first fetch "Script1.js" (priority level 1) and execute it; but during the execution of "Script1.js" it must also fetch "Script2.js" (priority level 1). As such operations 310 for Script1.js issue a GET for Script2.js having a priority level 2 and initiate a further instance of operations 310 at that priority level to process the response. The following workflow exchange represents message data flow between mobile device 102 and gateway 108 for the second above web page:

---> GET MainDocument.htm
<--- First packet of MainDocument.htm
---> Get Script1.js (with x-rim-request-priority=1)
<--- First packet of Script1.js
---> Get Script2.js (with x-rim-request-priority=2)
<--- First packet of Script2.js
<--- Last packet of Script2.js
<--- First packet of Script1.js
<--- Last packet of MainDocument.htm FIG. 4 illustrates a wireless transport gateway server 108 in accordance with an embodiment of the invention. Gateway server 108 comprises message receive queues 404 and send queues 410 for communicating with a plurality of wireless devices, such as device 102. Typically, there is a receive and send queue instance for each connection to a wireless device with which gateway 108 is communicating. An individual wireless device typically communicates via a single connection to the gateway. Thus all communications are serialized in a FIFO manner in accordance with the prior art.

Gateway 108 further comprises queues 408 and 414 for communicating with other devices coupled to gateway 108 such as web server 114 and 116. Gateway 108 further comprises a get handler 406 for processing GET requests from wireless devices, evaluating headers for priority levels and a get response handler 412 for processing responses, reordering data in respective queues 410 in response to the respective priority levels received.

Not shown, though understood to persons skilled in the art, are components of wireless gateway server 108 for maintaining connectivity between wireless devices and the gateway and translation components for communicating in accordance with various network protocols, for example, to pass data received in a wireless protocol to a server in a wired protocol and the converse thereof. Also not shown are components for routing communications between the particular devices for which the gateway provides its services.

In operation, gateway 108 receives GET requests for data and get handler 406 evaluates a header portion for a priority level, passing the request through to send to the appropriate web server. Responses received for the requests are handled by get response handler 412 in accordance with the priority level of the request as received. Data packets for a response to a request having no priority are placed at a tail end of the respective FIFO send queue for the device originating the request so that existing data in the queue is sent in accordance with FIFO rules. Data packets for a request having a higher priority are placed at a head end of the respective queue for the device originating the request, higher priority data being placed ahead of lower priority data, so that new data in the queue is sent in accordance with "last in first out" LIFO rules.

Though described herein with reference to a web browser application for navigating the Internet in accordance with a request/response protocol such as HTTP, for example, the present invention may be useful for other applications having a web page-like interface or for other communication protocols than HTTP.

The manor of reordering the queue could be done for various communication protocols. An alternative to including a priority indication in a header may be to add or otherwise include a byte for the priority in a message body portion of the stream, e.g. in a packet.

Benefits in accordance with a feature of the invention are better achieved when there is a relatively large amount of data in the send queue and a slower bandwidth communication between the queue and the receiving device. A disadvantage of the typical FIFO send queue sought to be overcome is that the send queue is so large that it will take a noticeable time for it to empty. Thus on faster communication networks, the send queue may not have much of a delay.

Persons of ordinary skill in the art will recognize that the priority does not necessarily have to advance by 1 for each request. If 2 items are encountered and their order of receipt is not important, two respective requests with the same priority may be sent and then the first response received by the gateway will be put in the queue first.

Consideration may be given to ensuring requests from the device do not time-out. Though not shown, it is common to time-out a connection if a response to a request is not received within a predetermined time. If a request is left too long without a packet being sent (e.g. after two minutes wait time on the device) then the connection will timeout. So it is desirable to periodically pre-empt the queue ordering and send something from responses in the queue that have "aged" (i.e. been delayed by higher-priority responses).

The above-described embodiments of the present application are intended to be examples only. Those of skill in the art may effect alterations, modifications and variations to the particular embodiments without departing from the scope of the application. The invention described herein in the recited claims intends to cover and embrace all suitable changes in technology.

We claim:

1. A method, in a system comprising a wireless communication device and a server, of ordering response data, the response data being received in the wireless communication device from the server, the method comprising the steps of:
   at the wireless communication device, sending a first request for first response data to the server;
   at the server, placing first response data in a send queue of a serial communication connection established between the wireless communication device and the server, and transmitting a first portion of the first response data to the wireless communication device;
   at the wireless communication device, after sending the first request, sending a second request for second response data to the server, the second request being sent with a respective relative priority that is higher than a priority of the first request; and
   at the server, placing second response data ahead of at least a remaining second portion of the first response data in the send queue of the serial communication connection.

2. The method of claim 1, further comprising:
   at the wireless communication device, before sending the second request, serially receiving, via the communication connection, the first portion of the first response data.

3. The method of claim 2, further comprising, at the wireless communication device:
   processing the first portion of the first response data prior to receiving the second response data;
   after receiving the second response data, processing the second response data ahead of the remaining second portion of the first response data; and
   after receiving the remaining second portion of the first response data, completing processing of the remaining second portion of the first response data once processing of the second response data is completed.

4. The method of claim 1, further comprising:
   at the wireless communication device, after sending the second request, sending a third request for third response data to said server from the wireless communication device;

said third request being sent with a respective relative priority that is higher than the priority of the second request; and at the server, placing the third response in the send queue of the serial communication connection ahead of at least a portion of the second response data.

5. The method of claim 4, further comprising:

at the wireless communication device, before sending the third request, serially receiving, via the communication connection, a first portion of the second response data; and wherein the third response data is placed in the send queue ahead of at least a remaining second portion of the second response data.

6. The method of claim 5, further comprising, at the wireless communication device:

processing the first portion of the second response data prior to receiving the third response data;

after receiving the third response data, processing the third response data ahead of the remaining second portion of the second response data; and after receiving the remaining second portion of the second response data, completing processing of the remaining second portion of the second response data once processing of the third response data is completed.

7. The method of claim 1, further comprising, at the wireless communication device, periodically receiving portions of the first response data ahead of portions of the second response data at the wireless communication device and processing said periodically received portions of the first response data in order to avoid timing out of a connection between the server and the wireless communication device.

8. The method of claim 1, wherein the wireless communication device assigns a priority indication to any request determined to require an immediate response.

9. The method of claim 8 wherein the wireless communication device assigns to each subsequent request determined to require an immediate response a priority indication comprising an incremented value of a last such request.

10. The method of claim 8, wherein the wireless communication device sends the priority indication in a header portion of the request.

11. The method of claim 1, wherein determining the respective relative priority comprises evaluating a first portion of the first response data to determine the second request having a higher priority than the first request and defining the priority of the second request as having higher priority relative to the first request.

12. The method of claim 1, further comprising suspending processing of said first response data at the wireless communication device until processing of the second response data is complete.

13. A system for ordering response data, the system comprising a wireless communication device communicating serially with a server via a communication connection established between the wireless communication device and the server, the communication connection having a send queue for serially transmitting data, wherein the wireless communication device comprises a processor configured to execute instructions to cause the wireless communication device to:

send a first request for first response data to said server; and after the first request has been sent, send a second request for second response data to said server, said second request being sent with a respective relative priority that is higher than a priority of the first request;

wherein the server comprises a processor configured to execute instructions to cause the server to:

place first response data in the send queue of the communication connection, and transmit a first portion of the first response data to the wireless communication device; and place the second response data in the send queue of the communication connection ahead of at least a remaining second portion of the first response data.

14. The system of claim 13, wherein the processor of the wireless communication device is further configured to execute instructions to cause the wireless communication device to:

before sending the second request, serially receive, via the communication connection, the first portion of the first response data.

15. The system of claim 14, wherein the processor of the wireless communication device is further configured to execute instructions to cause the wireless communication device to:

process the first portion of the first response data prior to receiving the second response data;

after receiving the second response data, process the second response data ahead of the remaining second portion of the first response data; and after receiving the remaining second portion of the first response data, complete processing of the remaining second portion of the first response data once processing of the second response data is completed.

16. The system of claim 13, wherein the processor of the wireless communication device is further configured to execute instructions to cause the wireless communication device to:

after the second request has been sent, send a third request for third response data to said server from the wireless device; and said third request being sent with a respective relative priority that is higher than the priority of the second request;

wherein the processor of the server is further configured to execute instructions to cause the server to:

the third response data at said wireless device, place the third response data in the send queue of the communication connection ahead of at least a portion of the second response data.

17. The system of claim 16, wherein the processor of the wireless communication device is further configured to execute instructions to cause the wireless communication device to:

before sending the third request, serially receive, via the communication connection, a first portion of the second response data; and wherein the third response data is placed in the send queue ahead of at least a remaining second portion of the second response data.

18. The system of claim 17, wherein the processor of the wireless communication device is further configured to execute instructions to cause the wireless communication device to:

process the first portion of the second response data prior to receiving the third response data;

after receiving the third response data, process the third response data ahead of the remaining second portion of the second response data; and after receiving the remaining second portion of the second response data, complete processing of the remaining second portion of the second response data once processing of the third response data is completed.

19. The system of claim 13, wherein the processor of the wireless communication device is further configured to execute instructions to cause the wireless communication device to send a priority indication in association with a request for particular response data for any request determined to require an immediate response.

20. The system of claim 19, wherein the processor of the wireless communication device is further configured execute instructions to cause the wireless communication device to increment the value of a priority indication for each subsequent request determined to require an immediate response.

21. The system of claim 19, wherein the processor of the wireless communication device is further configured execute instructions to cause the wireless communication to send the priority indication in a header portion of the request.

22. The system of claim 13, wherein the processor of the wireless communication device is further configured execute instructions to cause the wireless communication to determine the priority of one set of response data relative to any other response data.

23. The system of claim 22, wherein the processor of the wireless communication device, in order to determine the priority, is further configured to execute instructions to cause the wireless communication device to:
  evaluate a first portion of the first response data to determine the second request having a higher priority than the first request; and
  define the priority indication of the second request as having higher priority relative to the first request.

* * * * *